United States Patent
Smith

(10) Patent No.: US 6,883,777 B2
(45) Date of Patent: Apr. 26, 2005

(54) VALVE ASSEMBLY

(75) Inventor: David Smith, Lawrenceville, NJ (US)

(73) Assignee: Strahman Valves Inc., Florham Park, NJ (US)

( * ) Notice: Subject to any disclaimer, the term of this patent is extended or adjusted under 35 U.S.C. 154(b) by 140 days.

(21) Appl. No.: 10/444,207

(22) Filed: May 27, 2003

(65) Prior Publication Data

US 2004/0238771 A1 Dec. 2, 2004

(51) Int. Cl.[7] .............................................. F16K 47/00
(52) U.S. Cl. ........................ 251/118; 251/264; 138/39
(58) Field of Search .............................. 251/118, 119, 251/122, 264; 138/39

(56) References Cited

U.S. PATENT DOCUMENTS

| | | | | |
|---|---|---|---|---|
| 3,828,819 A | * | 8/1974 | Brogren .................... 251/144 |
| 4,013,096 A | * | 3/1977 | DeFrees .................... 251/144 |
| 4,126,294 A | * | 11/1978 | DeFrees .................... 251/367 |
| 4,518,149 A | * | 5/1985 | Gardner et al. ............. 251/144 |
| 4,836,236 A | * | 6/1989 | Ladisch ..................... 251/144 |
| 4,905,963 A | * | 3/1990 | Nichols ..................... 251/144 |
| 5,103,863 A | * | 4/1992 | Powers ...................... 137/592 |
| 5,341,523 A | * | 8/1994 | Barnes ......................... 4/507 |
| 5,734,999 A | * | 4/1998 | Nicholas ...................... 4/507 |
| 5,759,414 A | * | 6/1998 | Wilkes et al. ................. 4/509 |
| 6,810,537 B1 | * | 11/2004 | Barnes et al. .............. 137/362 |

* cited by examiner

Primary Examiner—John Bastianelli
(74) Attorney, Agent, or Firm—Graham, Curtin & Sheridan; Richard T. Laughlin, Esq.

(57) ABSTRACT

A valve assembly for a liquid containing tank or the like, having a vortex breaker within the tank of liquid, and affixed to an external valve. The valve has a discharge port and a valve body with an outer member which allows the flow of liquid and a concentrically-spaced inner member provided with upper and lower seals to prevent the leakage of the liquid and allow uniform closure of the valve. The inner tubular member is movable vertically such as with a screw thread and associated handle, from a closed to an open position to allow flow of the liquid from the tank to a discharge port.

26 Claims, 2 Drawing Sheets

VALVE ASSEMBLY

BACKGROUND

This invention relates to a discharge valve assembly for a tank or the like containing a liquid and more particularly to such a valve having a vortex breaker for maintaining uniform flow.

Tanks or other constructions for containing liquids are widely used in the pharmaceutical and bio-technology field which require methods and apparatus for ease of cleaning, and for removing at least a portion of the liquid in a uniform and rapid manner. Most valves for tanks are constructed to obtain maximum flow of the liquid being discharged in a minimum amount of time and are not concerned with uniform flow.

U.S. Pat. No. 4,013,096 which issued on Mar. 22, 1977 and U.S. Pat. No. 4,126,294 which issued on Nov. 21, 1978, both to Joseph H. DeFrees; U.S. Pat. No. 5,341,523 issued Aug. 30, 1994 to Steven R. Barnes; and U.S. Pat. No. 4,518,149 which issued on May 21, 1985 to John F. Gardner, generally disclose a combination of vortex breakers and valves for tanks.

U.S. Pat. No. 4,905,963 issued on Mar. 6, 1990 to Dwight E. Nichols discloses a sliding gate tank valve assembly in which fluid pressure on the gate is at right angles to the direction of flow for purposes of breaking the formation of a vortex.

U.S. Pat. No. 3,828,819 which issued on Aug. 13, 1974 to Erik E. Brogren discloses vanes which serve as a vortex breaker and U.S. Pat. No. 4,836,236 which issued to Thomas P. Ladisch is directed to a flush sealing tank valve.

SUMMARY OF AN EMBODIMENT OF THE INVENTION

It is an object of the invention to provide a combination value which contains a vortex breaker and a simplified shut off.

It is another object of the invention to provide a valve for a liquid container with reduced field welding and finishing and also reduced associated labor costs and time of manufacturer.

It is a further object of the invention to provide a valve with reduced flow losses.

It is still another object of the invention to provide a valve to maintain fluid contact and correct fluid velocity with minimized air entrapment.

It is still another object of the invention to provide a valve assembly which is readily cleanable allowing its use in pharmaceutical and bio-technical operations.

It is a further object of the present invention to provide a compact discharge valve without reducing efficiency.

It is still a further object of the invention to provide a valve capable of positive sealing to prevent leakage in both the open and closed valve positions.

Another object of the invention is to provide a discharge valve which is easy to operate.

A still further object of the invention is to provide a valve assembly for a tank or the like which permits a large volume discharge rate flow without vortices in the throat of the discharge opening which interferes with the discharge.

It is a further objective of the invention to provide a discharge valve for a tank which permits a large volume discharge rate without formation of vortices of second liquid phase, such as oil and water, where the second phase, such as oil, will tend not to be easily entrained in the first fluid, such as water, thereby allowing for a better phase separation.

In accordance with one embodiment of the invention a valve assembly is provided for the discharge of liquid from a tank or the like which includes a novel vortex breaker and a valve for controlling the flow of liquid to a lower located discharge port. The vortex breaker is positioned at an opening in the tank to allow removal of the liquid from the tank to flow in a smooth flow. The configuration of the invention allows the utilization of a valve of smaller dimension than normally required to obtain the same flow. A traditional vortex breaker is a flat, circular disk, supported off the bottom of the vessel by welded tabs provided by the vessel supplier.

In accordance with the invention, a vortex breaker is provided which is a complex disk formed by a generally convex-shaped leg supported off the bottom of the vessel by a connecting member to the lower leg contoured to promote streamlined flow of the tank's fluid as it passes the member and leaves the vessel through the integrated valve associated with the vortex breaker. The upper portion or leg of the convex vortex breaker disk directs liquid flow to the lower edges of the disk, thereby preventing the pooling of liquid on top of the disk and making it more easily cleaned by the flowing fluid in the vessel. The lower portion of the convex vortex breaker or lower leg forms a streamlined flow path between the bottom of the vessel and the integrated shut-off valve where the departing fluid is uniformly accelerated into the throat of the discharge passageway.

A conduit such as a tube, is affixed to the discharge passageway extends from the lower portion of the tank directly below the vortex breaker to allow flow of the liquid out of the container to a lower positioned discharge port. A valve is provided at the lower discharge port to control the flow of liquid. The discharge port is affixed to the vertical conduit at a desired location which is preferably sloping downward at an angle to allow the even flow of the liquid. The shut-off valve can be a solid metal, cylindrical member located within the conduit tube which is moveable vertically within the conduit to open and close off the flow of liquid to the lower discharge port.

It is preferred that upper and lower "O" ring seals are provided around the solid member which bracket the lower discharge port to prevent the passage of liquid around the solid cylindrical member in the tube. Additional seals can be provided, such as Teflon sleeves or washers, to further assure that no liquid is lost.

Means are provided for moving the solid member from a position of preventing the flow of liquid from the container to the discharge port and a second, lower position which allows flow of the liquid from the container to the discharge port. The solid member can have an actuation shaft extension which is threaded at its lower end. The threaded portion meshes with a collar of similar threads which when rotated will cause the solid member to move upward into a closed position and when reversed moves downward to open the valve and allow the flow of the liquid from the tank to the lower discharge port.

Further objects, features and the advantages of the invention will become evident from a consideration of the following detailed description when taken in conjunction with the accompanying drawings and the appended claims.

DETAILED DESCRIPTION

Figure 1:
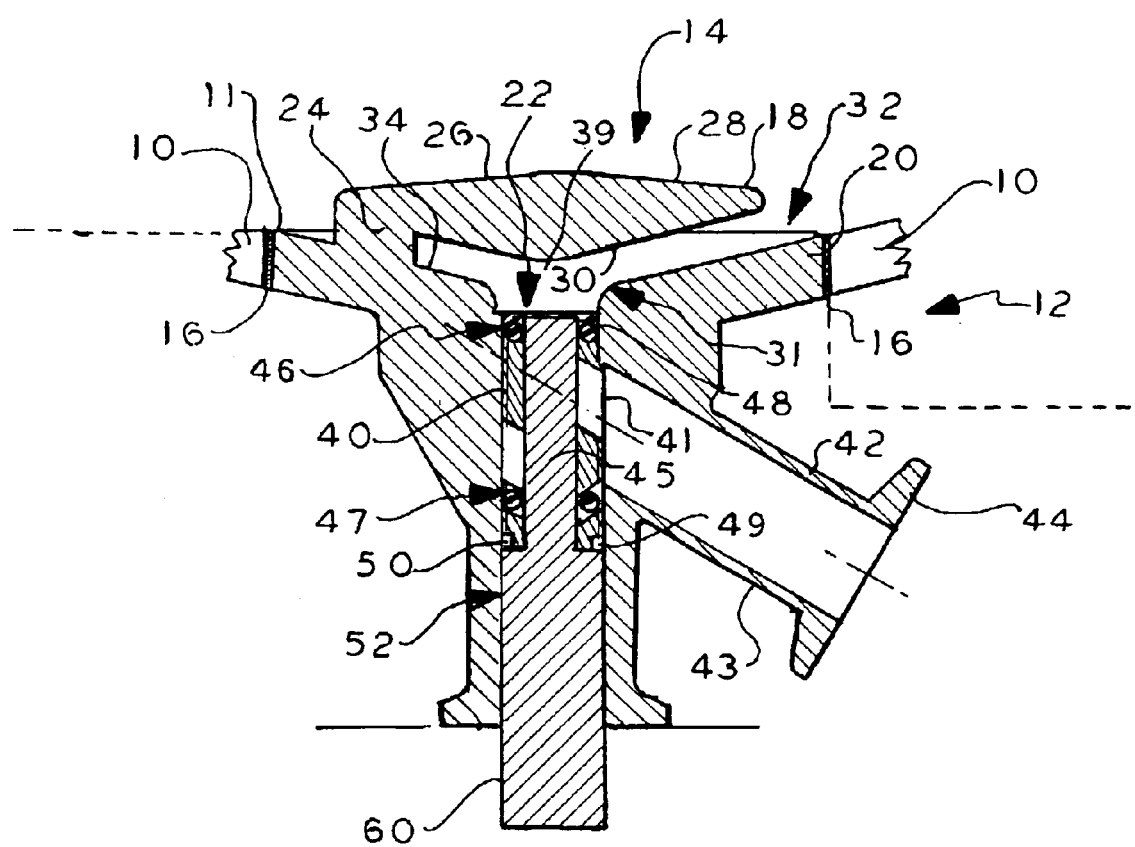
FIG. 1 is a cross-sectional view of a tank and valve assembly in the closed position according to the present invention.
Figure 2:
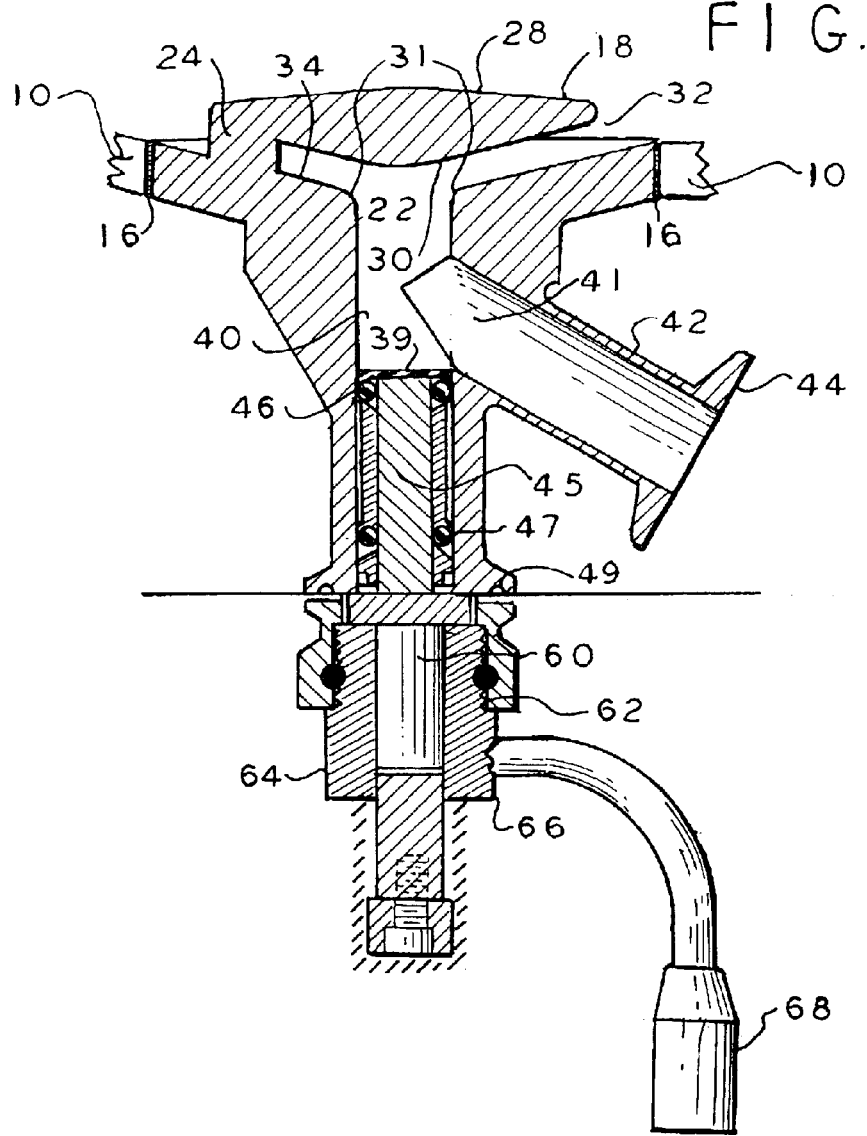
FIG. 2 is a cross-sectional view of a tank and valve assembly in an open position in accordance with the present invention.
Figure 3:
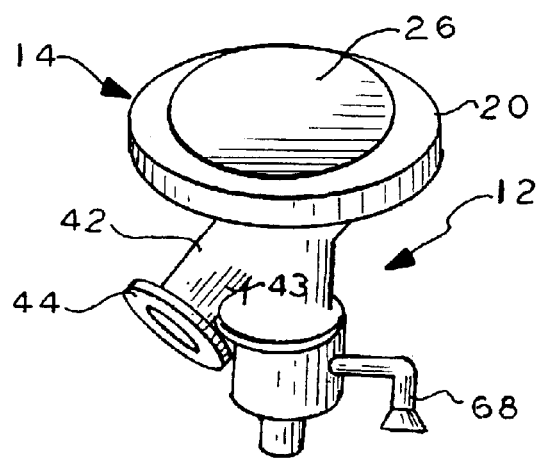
FIG. 3 is an isometric view of the valve assembly according to the present invention.

In accordance with the invention with reference to FIGS. 1, 2 and 3 of the drawings, a tank 10 for liquid storage or transport has a valve assembly generally indicated at 12. In the configuration shown in FIG. 1 the valve is in the closed position. In FIG. 2 the valve is shown in the open position.

The tank 10 is provided with a vortex breaker generally indicated at 14 which can be welded 16 or adhesively secured in place or otherwise affixed at the bottom of the tank 10 in an opening 11. The tank bottom surface can be dished, spherical or conical, based on the tank design. The vortex breaker 14 comprises an upper leg element 18 and a lower leg element 20 which are in the form of concentric disks. The two elements 18, 20 are affixed with contoured connecting element 24 along only a portion of the elements 18, 20 to allow structural strength while permitting sufficient area generally indicated at 32 for the liquid to flow from the tank 10 between the legs 18, 20. The upper leg 18 has a convex upper surface 26 yielding a gradual sloped surface 28. The underside 30 of the upper disk 18 is also convex forming a greater thickness at the center of the upper leg 18 with gradual sloping sides extending from the center. A slope of between 5 to 30 degrees from the horizontal is preferred. The lower leg 20 has a substantially greater diameter than the upper leg, creating the flow area for the liquid generally indicated at 32. The upper surface 34 of the lower leg 20 conforms with the lower surface 30 of the upper leg so the passage for the liquid between the legs is generally uniformly accelerating as it approaches the valve passageway 22. The passageway 32 in the lower leg 20 has a smooth radius 31 on the leg to promote uniform flow of the liquid. The lower leg 20 has a centrally located opening or passageway 22 for the passage of the liquid to the valve which controls the flow of liquid. The passageway 22 is connected to a tube 40 through which the liquid flows.

The diameter of the top leg of the vortex breaker is preferably about four times the inlet tube diameter with a range of about two to about six times being useful. The gap between the tank bottom and the upper leg of the vortex breaker is preferably one-quarter to one-half the diameter of the inside dimension of the tubing inlet for the valve. One of the important advantages of the invention is that use of the vortex breaker of the invention enables the substantial reduction in the size of valve required with the corresponding reduction in cost of the valve assembly. As indicated, the best results are obtained with a slope of the surface of the bottom leg of about 5 to about 30 degrees from the horizontal.

The valve assembly 12 is affixed to the vortex breaker at the passageway 22 and provides a vertical, hollow cylindrical tube 40 extending downward from the passageway 22 for allowing the liquid to flow from the passageway 22 in the lower leg 20 to a discharge port 42 through the mouth or opening 41. A suitable discharge port would be an inclined tube 43 leading to a tri-clamp end fitting 44. A solid closure element 45 concentrically located within the hollow cylinder tube 40 moves in a vertically direction forming a seal on the entrance or opening 41 to outlet port 42 when in an upper position as show in FIG. 1. When in a lower open position as shown in FIG. 2, the liquid flows from the tank 10 to the discharge port 42.

O-rings 46, 47 are provided around the solid closing member 45 for a positive seal between the closing member 45 and the tubular member 40. The O-rings are located to provide positive seating and sealing of discharge port 42 when the closure member 46 is fully inserted in the closed position. The sealing effect of the O-rings can be supplemented by additions washers such as formed from Teflon sleeve 39 and a secondary seal 49.

The valve assembly 12 may be secured within a tank opening in any manner. For example, the valve body may be integrally molded into the tank wall. Alternatively, the assembly 14 could be made of metal and welded 16 in place on a metal tank discharge opening 11.

Means are provided for moving the solid member from a position of preventing the flow of liquid as shown in FIG. 1 to an open position as shown in FIG. 2 which allows the fluid to flow to the discharge port 42. A useful means for accomplishing this movement is by having an actuation shaft extension 60 on the closure element 45 which is threaded 62 at its lower end 64. The threaded portion 62 meshes with a collar 66 of similar threads which when rotated by a suitable crank and handle 68 will cause the solid member 46 to move into a closed position as shown in FIG. 1 and when reversed moves downward to open the valve as shown in FIG. 2 and allow the flow of the liquid from the tank 10 to the discharge port 42 through opening 41.

The preferred valve is a one inch valve utilizing a one inch outside diameter tube which has an inside diameter of seven-eighths of an inch. Valves from one-half inch up to about eight inches can be utilized with the vortex breaker of the invention which has an emptying capability as if a one-and-one-half inch to a thirty-two inch valve were utilized.

In operation, the operating handle 68 is revolved in a counter-clockwise direction which causes the closure element 45 to move downward to open the valve. The rotation is continued until the closure element is completely open with the O-rings 46, 47 passing the discharge opening 41 of the discharge port 42. The opening of the closure element will allow the liquid to flow from the tank 10 through the opening or passageway 32 between the upper leg 18 and the lower leg 20 in a uniformly accelerating flow because of the actions of the vortex breaker 14. In this manner, the liquid is uniformly accelerated from a slow velocity within the tank to a high velocity inside tube 40 while minimizing air entrapment.

Although the invention has been described utilizing a ram style valve which is preferred, the vortex breaker of the invention can also be utilized with other valves, such as a diaphragm valve, a radial diaphragm valve, a ball valve, a butterfly valve, a plug valve and the like.

The invention has been described above in an illustrative manner and it is to be understood that the terminology which has been used is intended to be in the nature of words of description rather then that of limitation. Obviously many modifications and variations of the valve assembly according to the present invention are possible in light of the above teachings. It is therefore to be understood that within the scope of the appended claims, the invention may be practiced otherwise than as specifically described.

What is claimed is:

1. In a valve assembly useful for removing liquid from a tank or container through a discharge port in the container comprising a vortex breaker adjacent to the discharge port, and a control valve for regulating the flow of liquid from the discharge port, the improvement which comprises a vortex breaker of upper and lower circular shaped legs parallel to each other to form a passage for the liquid between the legs, the lower leg having a concave shaped upper surface and being positioned in close proximity to the upper leg, the concave shape of the upper surface of the lower leg allowing passage of the liquid from the container between the legs into a conduit affixed to the lower leg, the upper leg having a convex upper and lower surface and having a smaller diameter than the lower leg.

2. The valve assembly as defined in claim 1 wherein the two legs of circular configuration are affixed together at a portion of their peripheries to form the passageway for the liquid between the legs.

3. The valve assembly according to claim 2 wherein said discharge opening is in the bottom wall of said container.

4. The valve assembly as defined in claim 2 where the upper surface of the lower leg has smooth contours to reduce the resistance to the flow of fluid.

5. The valve assembly as defined in claim 2 wherein the slope of the upper and lower surfaces of the upper and lower legs is about 5 to about 30 degrees from the horizontal.

6. The valve assembly as defined in claim 2 wherein the control valve comprises a conduit affixed to the discharge port for receiving the liquid, a second discharge port affixed to the conduit for dispensing the liquid from the conduit, and means for closing the conduit to control the passage of the liquid in the conduit.

7. The valve assembly as defined in claim 2 wherein the conduit contains a closure element capable of moving in one direction to close off the second discharge port to the flow of fluid from the conduit and when moved in the opposite direction opens the second discharge conduit to allow passage of fluid from the conduit.

8. The valve assembly as defined in claim 2 where the discharge port has an affixed tubing of from about one-half to eight inches in outside diameter to allow the liquid to flow to the valve.

9. The valve assembly as defined in claim 8 wherein the closure element is a solid member with O-rings at each end of the member to prevent the passage of liquid around the member.

10. The valve assembly as defined in claim 9 wherein the diameter of the upper leg is about three to six times the diameter of the tubing.

11. The valve assembly as defined in claim 9 wherein the upper leg is about four times the diameter of the tubing.

12. The valve assembly as defined in claim 9 wherein the distance between the legs is about one-fourth to about one-half the diameter of the tubing.

13. The valve assembly as defined in claim 12 wherein the solid member is threaded at its lower end and affixed to a hand operated threaded collar for moving the rod into a position where no fluid from the conduit flows and in the opposite direction where fluid from the conduit flows to the second discharge port.

14. A valve assembly for removing liquid in a uniform flow from a tank or container comprising: a container for liquid with a lower portion, a circular discharge opening in the lower portion, comprises a vortex breaker of upper and lower circular shaped legs parallel to each other to form a passage for the liquid between the legs, the lower leg having a concave shaped upper surface and being positioned in close proximity to the upper leg, the concave shape of the upper surface of the lower leg allowing passage of the liquid from the container between the legs into a conduit affixed to the lower leg, the upper leg having a convex upper and lower surface and having a smaller diameter than the lower leg a vertical conduit extending from said opening to allow flow of the liquid out of the container, a discharge port affixed to the vertical conduit at an angle extending downward, a shut off valve located within the conduit having a solid member moveable within the conduit, upper and lower seals on the solid member to prevent flow of the liquid between the conduit and the closure member, means for moving the solid member from a position of preventing the flow of liquid from the container to a second, lower position which allows flow of the liquid from the container to the discharge port.

15. The valve assembly according to claim 14 wherein said discharge opening is in the bottom wall of said container.

16. The valve assembly as defined in claim 15 where the discharge port has an affixed tubing to allow the liquid to flow to the valve, wherein the tubing is from one-half inch to eight inches in outside diameter.

17. The valve assembly as defined in claim 16 wherein the diameter of the upper leg is about four times the diameter of the tubing.

18. The valve assembly as defined in claim 17 wherein said sold member comprises a tubular member moveable vertically from a closed to an open position.

19. The valve assembly according to claim 17 wherein said inner tubular member has a circumferential outwardly open groove facing said outer tubular member of said body and an O-ring disposed in said groove, said O-ring being compressed between said tubular member and said body to maintain a seal between said body and said member during movement of said member between the closed and open positions.

20. The valve assembly according to claim 19 wherein the other end of said inner tubular member comprises a cylindrical threaded portion engage able with a stationary threaded element, said threads on said inner member and a flange portion having a greater radius than said cylindrical portion for engaging said tubular member.

21. The valve assembly as defined in claim 19 wherein said sold member comprises a tubular member moveable vertically from a closed to an open position.

22. The valve assembly as defined in claim 19 wherein the control valve comprises a conduit affixed to the discharge port for receiving the liquid, a second discharge port affixed to the conduit for dispensing the liquid from the conduit, and means for closing the conduit to prevent the passage of the liquid in the conduit.

23. The valve assembly as defined in claim 19 wherein the conduit contains a closure element capable of moving in one direction to close off the second discharge port to the flow of fluid from the conduit and when moved in the opposite direction opens the second discharge conduit to allow passage of fluid from the conduit.

24. The valve assembly as defined in claim 23 wherein the closure element is a solid rod with O rings at each end of the rod to prevent the passage of liquid.

25. The valve assembly as defined in claim 23 wherein the solid rod is threaded at its lower end and affixed to a hand operated threaded collar for moving the rod into a position where no fluid from the conduit flows and in the opposite direction where fluid from the conduit flows to a discharge port.

26. The valve assembly as defined in claim 23 wherein the slope of the upper and lower surfaces of the upper and lower legs is less than 1 to 10.

* * * * *